United States Patent
McHale et al.

(10) Patent No.: US 9,068,800 B2
(45) Date of Patent: Jun. 30, 2015

(54) SYSTEM AND METHOD OF LOCATING PREY

(71) Applicant: TrackingPoint, Inc., Austin, TX (US)

(72) Inventors: John Francis McHale, Austin, TX (US); John Hancock Lupher, Austin, TX (US)

(73) Assignee: TrackingPoint, Inc., Pflugerville, TX (US)

( * ) Notice: Subject to any disclaimer, the term of this patent is extended or adjusted under 35 U.S.C. 154(b) by 76 days.

(21) Appl. No.: 13/732,200

(22) Filed: Dec. 31, 2012

(65) Prior Publication Data

US 2014/0188385 A1    Jul. 3, 2014

(51) Int. Cl.
| | |
|---|---|
| *F41G 1/00* | (2006.01) |
| *F41G 1/473* | (2006.01) |
| *G01C 21/20* | (2006.01) |
| *G01C 21/26* | (2006.01) |
| *F41G 3/06* | (2006.01) |
| *G01C 3/08* | (2006.01) |

(52) U.S. Cl.
CPC ............... *F41G 1/473* (2013.01); *G01C 21/20* (2013.01); *G01C 21/26* (2013.01); *F41G 3/065* (2013.01); *G01C 3/08* (2013.01)

(58) Field of Classification Search
CPC ............... F41G 1/00; F41G 3/00; F41G 3/26; F41G 3/14; F41G 11/00; G01C 3/00; G01C 3/04; G01C 5/00; G01C 17/38
USPC ......... 701/468, 530, 523, 472, 514, 300, 302; 235/404, 412, 417, 414; 434/19, 22, 434/27; 42/119
See application file for complete search history.

(56) References Cited

U.S. PATENT DOCUMENTS

| | | | | |
|---|---|---|---|---|
| 5,825,480 | A * | 10/1998 | Udagawa | 356/138 |
| 6,724,341 | B1 * | 4/2004 | Pereira et al. | 342/62 |
| 2008/0040036 | A1 * | 2/2008 | Peters et al. | 701/213 |
| 2008/0144864 | A1 * | 6/2008 | Huon | 381/305 |
| 2013/0059632 | A1 * | 3/2013 | Roman et al. | 463/7 |
| 2013/0288205 | A1 * | 10/2013 | Lupher et al. | 434/19 |
| 2013/0288216 | A1 * | 10/2013 | Parry et al. | 434/267 |

* cited by examiner

*Primary Examiner* — Richard Camby

(74) *Attorney, Agent, or Firm* — Cesari & Reed LLP; R. Michael Reed

(57) ABSTRACT

A method includes receiving location data corresponding to a physical location of a user at a computing device and receiving prey data corresponding to a relative position of an animal at the computing device from a gun scope. The method further includes determining a location of the animal relative to the computing device based on the location data and the prey data.

17 Claims, 7 Drawing Sheets

SYSTEM AND METHOD OF LOCATING PREY

FIELD

The present disclosure is generally related to rifle scopes, and more particularly to rifle scopes configured to determine a range to a selected target.

BACKGROUND

Hunters often use hunting dogs to locate and retrieve prey. For example, duck hunters commonly utilize dogs to startle fowl into the air and may utilize the dogs to retrieve the selected target when the shooter knocks the fowl from the air with the shot. When the hunter employs a scope with zoom functionality and a firearm capable of firing several hundred yards, it can be challenging to reacquire the location of the prey once the shooter has stepped out to retrieve the prey, particularly in rocky/hilly terrain that may require the shooter to take a circuitous path to the prey.

SUMMARY

In an embodiment, a method includes receiving location data corresponding to a physical location of a user at a computing device and receiving prey data corresponding to a relative position of an animal at the computing device from a gun scope. The method further includes determining a location of the animal relative to the computing device based on the location data and the prey data.

In another embodiment, a computing device includes a display, a processor coupled to the display a processor, and a memory accessible to the processor. The memory is configured to store instructions that, when executed by the processor, cause the processor to determine a physical location of the computing device, receive prey data corresponding to a relative position of an animal, and determine a physical location of the animal based on the physical location of the computing device and the prey data.

In still another embodiment, a computer-readable storage device is configured to store instructions that, when executed by a processor, cause a processor to receive location data associated with a physical location of at least one of a computing device associated with the processor and a gun scope configured to communicate with the computing device. The instructions further include instructions that cause a processor to receive prey data corresponding to a position of a selected target relative to the gun scope and determine a location of the selected target based on the location data and the prey data an apparatus includes a computing device including a display.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Described below are embodiments of a firearm system that are configured to determine a location of an animal relative to a location of an optical scope. In an embodiment, the optical scope may determine prey location data including a range to an animal and an orientation (direction, inclination, etc.). The prey location data may indicate a physical position of an animal relative to the location of the optical scope, which may provide the prey location data to a computing device through a wireless communication link. The computing device may determine its physical location (based on global positioning satellite (GPS) coordinates, for example) and may calculate a relative location of the animal based on the prey location data. In some embodiments, the computing device may provide an indicator to a display of the computing device to assist the user in finding the animal. In an example, the indicator may be a map depicting the shooter's location and the location of the animal. In a particular embodiment, the computing device may update the map as the shooter moves, drawing a line from the starting location to the user's current position, and ultimately connecting the starting position to the animal's location, when the user arrives at the destination.

In the above-described embodiment, the optical scope provides the prey location data to a computing device configured to determine the location of the animal. However, it is also possible to include GPS circuitry within the optical scope and the optical scope may provide the animal location to a display internal to the optical scope or may provide the animal location and the GPS coordinates to the computing device for display. One possible example of a firearm system configured to determine a location of an animal is described below with respect to FIG. 1.

Figure 1:
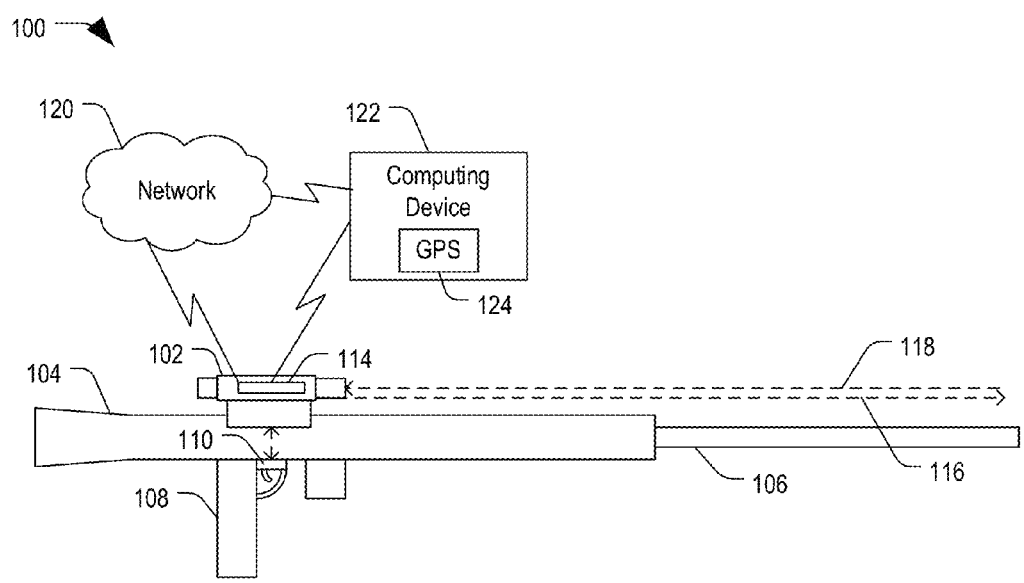
FIG. 1 is a block diagram of a system including an optical device communicatively coupled to a computing device configured to determine a prey location according to an embodiment.

FIG. 1 is a block diagram of a system 100 including an optical device 102 communicatively coupled to a computing device 122 configured to determine a prey location according to an embodiment. In the illustrated embodiment, optical device 102 is depicted as a gun scope; however, optical device 102 may be implemented as a spotting scope, binoculars, a telescope, or any number of other optical devices configured to determine a range to a selected object. Optical device 102 may be configured to communicate with at least one of a network 120 and computing device 122 through a wireless communication link. In an example, network 120 may be the Internet, a local area network, a communications network (such as a cellular, digital, or satellite communications network), or any combination thereof.

Optical device 102 is coupled to a firearm 104 that includes a muzzle 106, a handle or grip 108, and a trigger assembly 110. Optical device 102 includes a circuit 114 including one or more orientation sensors and a range finding circuit that is configured to direct a beam (signal) 116 toward a selected target and to receive a reflected version of the beam (signal) 118 to determine a range to the target. In an embodiment, circuit 114 may include a GPS circuit configured to communicate with network 120 to retrieve GPS coordinates associated with optical device 102.

Computing device 122 may be a smart phone or other portable computing device, such as a laptop or tablet computer or other electronic device that includes a GPS circuit 124. Computing device 122 may communicate with network 120 to retrieve GPS coordinates. Further, computing device 122 may communicate with circuit 114 within optical device 102 to receive prey data and optionally GPS coordinates.

In an embodiment, a user may select a target by interacting with optical device 102. In a particular embodiment, the user may select a target by triggering a range finding operation. In another embodiment, the user may interact with optical device or with a button (not shown) associated with trigger assembly 110 to initiate a target selection operation in which the user may align a reticle to a selected target and place a visual marker or tag on the target. In response thereto, optical device 102 may determine a range to the selected target as well as orientation data, which may include an incline, cant, direction, and other information. In an embodiment, optical device 102 may determine its location by communicating with network 120 or communicating with computing device 122. Optical device 102 may then calculate a prey location relative to the location of optical device 102 based on the range data, the orientation data of the optical device 102, and the location determined from the network. Optical device 102 may communicate the prey location to computing device 122 for presentation to a user, such as via a display component.

In another embodiment, the optical device 102 may communicate the orientation data and range data of optical device 102 to computing device 122, which may determine the location of the prey based on GPS coordinates corresponding to computing device 122 or GPS coordinates corresponding to a physical location of optical device 102. Computing device 122 may provide a visual indicator to a display to indicate the location of the prey. In an embodiment, computing device 122 may generate a digital map and provide it to a display, assisting the shooter in finding the prey. In a particular example, computing device 122 may communicate with network 120 to retrieve a graphical map of an area corresponding to the location of the prey and the computing device 122. Computing device 122 may provide the visual indicator by superimposing one or more objects (such as balloons, dots, or other graphical elements) onto the graphical map and may present the resulting map to the display.

In some embodiments, computing device 122 may continue to monitor its physical location, tracking the shooter's progress as he/she advances from a first position to the location of the animal. The map may assist the shooter in advancing from a shooting location to the location of the animal, even if the shooter has to take a round-about (indirect) route to arrive at the location of the animal. In rough terrain, an indirect route may be the only way that a shooter can reach an animal.

As previously discussed, optical device 102 is implemented as a gun scope in FIG. 1; however, optical device 102 may have other implementations. In an example, optical device 102 may be implemented as a spotting scope, a telescope, binoculars, or another optical device. One possible example of optical device 102 that may be used alone or in conjunction with a firearm is described below with respect to FIG. 2.

Figure 2:
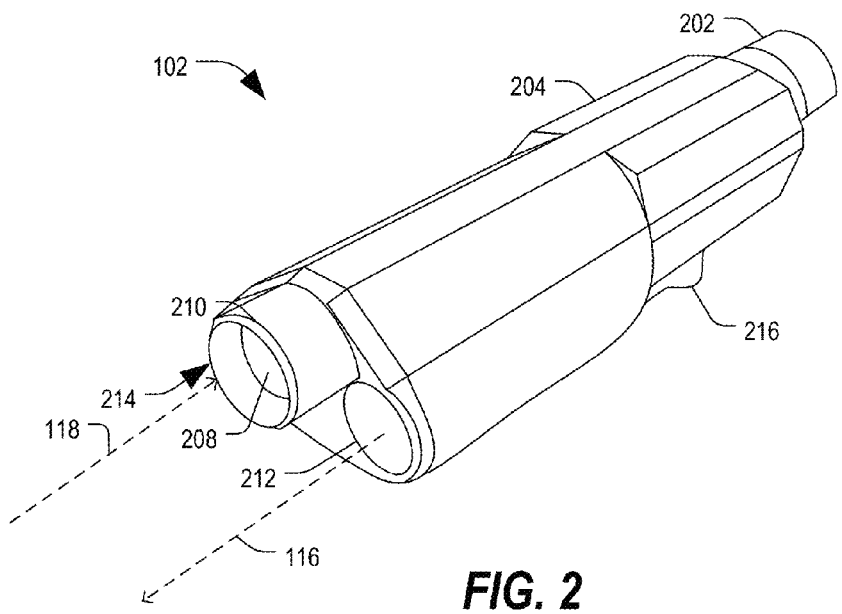
FIG. 2 is a perspective view of an optical device configured to communicate with the computing device of FIG. 1.

FIG. 2 is a perspective view of an optical device 102 configured to communicate with the computing device 122 of FIG. 1. Optical device 102 includes a lens portion 202, a housing portion 204 that defines a cavity sized to secure circuit 114, and an optical element 210. Optical element 210 includes an objective lens and other components configured to receive light and to direct and focus the light from a view area toward optical sensors associated with circuit 114. Optical device 102 further includes range finding circuitry, such as a laser range finder, and includes a first range finder element 212 configured to direct a beam 116 toward a target and a second range finder element 214 configured to receive a reflected beam 118 to determine a distance to the target. Optical device 102 further includes one or more ports, generally indicated at 216, that may be configured to couple to an external device, such as computing device 122. In an example, the one or more ports 216 may include a universal serial bus (USB) port, a firewire port, another high speed data port, a port for communication with trigger assembly 110, or any combination thereof.

In an embodiment, optical device 102 may be configured to determine a distance relative to a selected target, using first and second range finder elements 212 and 214 and associated range finder circuitry. Optical device 102 may further determine orientation data, such as a direction as well as orientation of optical device 102, and may communicate prey data including the relative distance and the orientation data to computing device 122, which may then determine the location of the animal relative to location data associated with one of the computing device 122 and the optical device 102. One possible example of a method of determining the location of an animal is described below with respect to FIG. 3.

Figure 3:
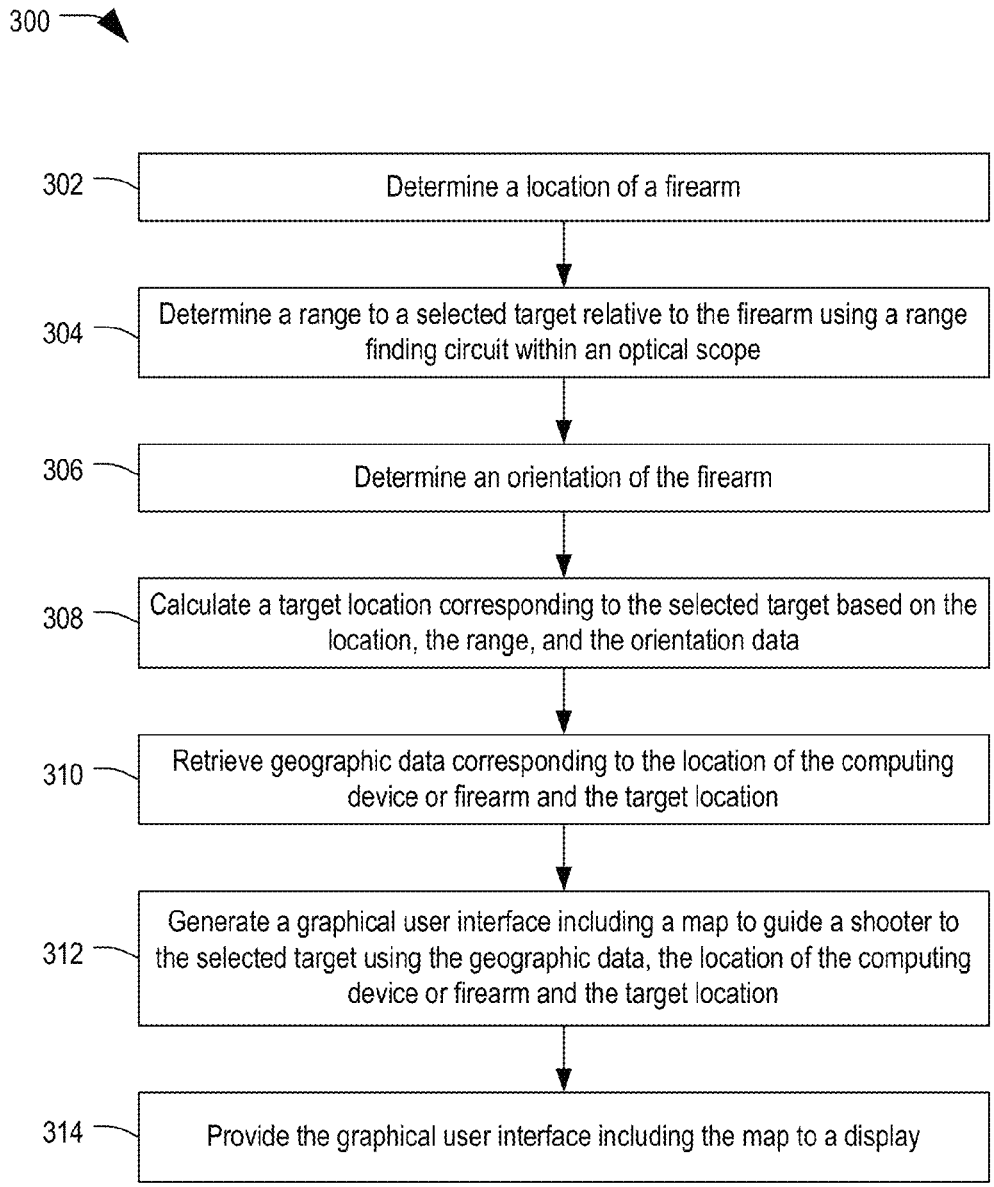
FIG. 3 is a flow diagram of an embodiment of a method of determining a prey location.

FIG. 3 is a flow diagram of an embodiment of a method 300 of determining a prey location. At 302, a location of a firearm is determined. In an embodiment, the location is determined from a GPS circuit within optical device 102 or may be inferred from a location of computing device 122, based on GPS coordinates from GPS circuit 124 and based on the assumption that the computing device 122 is in close proximity to optical device 102, which is also assumed to be attached to the firearm.

Advancing to 304, a range to a selected target is determined relative to the firearm using a range finder of the optical scope. In an embodiment, the range may be measured determined using a laser range finding circuit within the optical scope 102 or other type of range finder, and optical device 102 may communicate the range data to computing device 122. In another embodiment, computing device 122 determines the range by receiving range data from optical device 102. Continuing to 306, an orientation of the firearm is determined. In an example, the orientation may include directional parameters, incline parameters, tilt parameters, and so on. Such orientation data may be determined from one or more motion and/or orientation sensors within optical device 102 and may be communicated to computing device 122.

Continuing to 308, a target location is calculated that corresponds to the selected target based on the location of the firearm, the range, and the orientation data. In an embodiment, the target location may be calculated by a processor of optical device 102 and communicated to computing device 122. In another embodiment, the target location may be calculated by a processor of computing device 122.

Moving to 310, computing device 122 retrieves geographic data corresponding to the location of the computing device 122 and the target location. The geographic data may be retrieved from a data source that stores a plurality of maps. In an example, the geographic data may include topographical data. Proceeding to 312, computing device 122 generates a graphical user interface including a map to guide a shooter to the selected target using the geographic data, the location of the firearm, and the target location. In an embodiment, computing device 122 places one or more markers on the map, including a first marker corresponding to a location of the firearm and a second marker corresponding to the location of the selected target. Advancing to 314, computing device 122 provides the graphical user interface including the map to a display. In a particular embodiment, computing device 122 may track the user as he/she moves in the field, drawing a line from the first location to the location of the animal, while also continually providing updated tracking data for the current location of the user making it possible for the user to take an indirect route to the location of the selected target without losing the target location.

In general, optical device 102 may be implemented in a variety of configurations, including as a rifle scope, a telescope, a spotting scope, a pair of binoculars, or as another type of optical device. One possible implementation of optical device 102 is described below with respect to FIG. 4.

Figure 4:
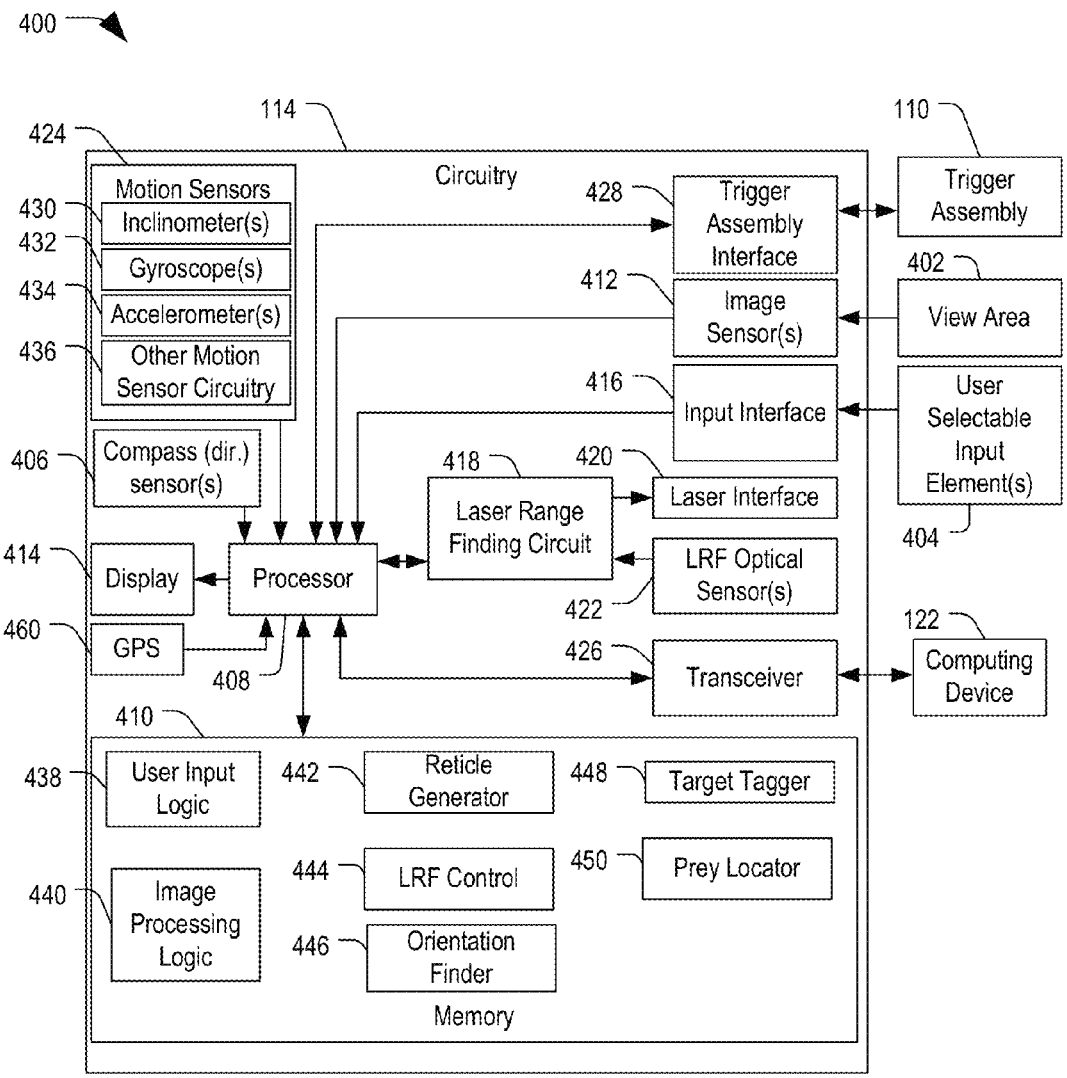
FIG. 4 is a block diagram of an embodiment of a system including an optical device configured to communicate with the computing device to determine a prey location.

FIG. 4 is a block diagram of a system 400 including an embodiment of optical device 102 including circuit 114 configured to communicate with the computing device 122 to determine a prey location. In the illustrated embodiment, optical device 102 is implemented as a gun scope, such as optical device 102 coupled to firearm 104 in FIG. 1. Circuit 114 may be coupled to trigger assembly 110. Further, circuit 114 may be configured to capture video data associated with a view area 402 and to receive one or more inputs corresponding to user selectable input elements 404, such as buttons or other user-selectable elements on firearm 104 or on housing 204 of optical device 102.

Circuit 114 includes a processor 408 coupled to a memory 410. Processor 408 is coupled to image sensors 412 configured to capture video data associated with view area 402 and coupled to a display 414 configured to display at least a portion of the video data. Processor 408 is coupled to user selectable input elements 404 through an input interface 416. Further, processor 408 is coupled to laser range finding circuit 418, which is configured to control a laser interface 420 configured to direct a beam toward a selected target and is coupled to laser range finder (LRF) optical sensors 422, which is configured to receive the reflected beam and to provide data related to the reflected beam to the laser range finding circuitry 418. Processor 408 is also coupled to motion sensors 424, to a transceiver 426 configured to communicate with computing device 122, and to a trigger assembly interface 428 configured to communicate with trigger assembly 110 of firearm 104.

Motion sensors 424 may include one or more inclinometers 430, gyroscopes 432, accelerometers 434, and other motion sensor circuitry 436. In an embodiment, motion sensors 424 may further include one or more magnetometers (compass or directional sensors) 406 configured to determine an aim direction of optical device 102.

In an embodiment, memory 410 is a computer-readable storage device (or data storage device) configured to store instructions and data. Memory 410 may be a flash memory or other non-volatile storage device. Memory 410 includes user input logic 438 that, when executed, causes processor 408 to interpret user input data received from input interface 416 and/or from trigger assembly interface 428. Memory 410 further includes image processing logic 440 that, when executed, causes processor 408 to process video data from image sensors 412 and to provide at least a portion of the video data to display 414. Memory 410 further includes a reticle generator 442 that, when executed, causes processor 408 to generate a reticle and to incorporate or superimpose the reticle on the video data before providing the video data to display 414. Memory 410 further includes LRF control instructions 444 that, when executed, causes processor 408 to interact with LRF circuitry 418 to determine a range to a target. Memory 410 also includes an orientation finder 446 that, when executed, causes processor 408 to determine a direction and orientation corresponding to the aim point of optical device 102. Memory 410 also includes a target tagger 448 that, when executed, causes processor 408 to receive a user input corresponding to a target selection via input interface 416 (or at a processor) and to apply a visual marker or tag to on a display 414, which corresponds to a location on a selected target, in response to the user input. Memory 410 also includes prey locator instructions 450 that, when executed, causes processor 408 to selectively determine prey data corresponding to the location of the selected target relative to optical device 102.

In an embodiment, circuit 114 includes a global positioning satellite (GPS) circuit 460 that can retrieve GPS coordinates corresponding to a physical location of optical device 100. Alternatively, the GPS coordinates may be determined by a GPS circuit 124 within computing device 122. If circuit 114 includes GPS circuit 460, the location data may be passed to computing device 122 together with the range to the selected target and corresponding directional data. In such an embodiment, computing device 122 may operate as a map generator that simply receives all the data from optical device 100 and generates a map in response thereto.

In an embodiment, a user may select a target within a view area of optical device 102 by interacting with one or more user-selectable input elements 404. In response to receiving a user input to select a target, processor 408 may execute target tagger instructions 448 to apply a visual marker to the target within the video data provided to the display 414, together with a reticle generated using reticle generator 442. Processor 408 may execute LRF control 444 to determine a range to the selected target. Further, processor 408 may execute prey locator instructions 450 to process orientation data from motion sensors 424 and direction data from magnetometer(s) (compass or directional sensors) 406 to determine prey data corresponding to the relative location of the selected target. Processor 408 may then communicate the prey data to computing device 122 via transceiver 426, which may be a wireless transceiver configured to communicate with computing device 122 through a radio frequency (wireless) communication link. In an alternative embodiment, the communication link may be a wired link, such as a universal serial bus (USB) cable or other wired link.

In an alternative embodiment, processor 408 may transmit directional data, orientation data, and range data corresponding to a state of optical device 102 to computing device 122, which may then determine the location of the selected target.

Computing device 122 may be smart phone, a tablet computer, a portable computer, or another electronic device including a display. One possible example of computing device 122 that is a communication device, such as a smart phone, is described below with respect to FIG. 5.

Figure 5:
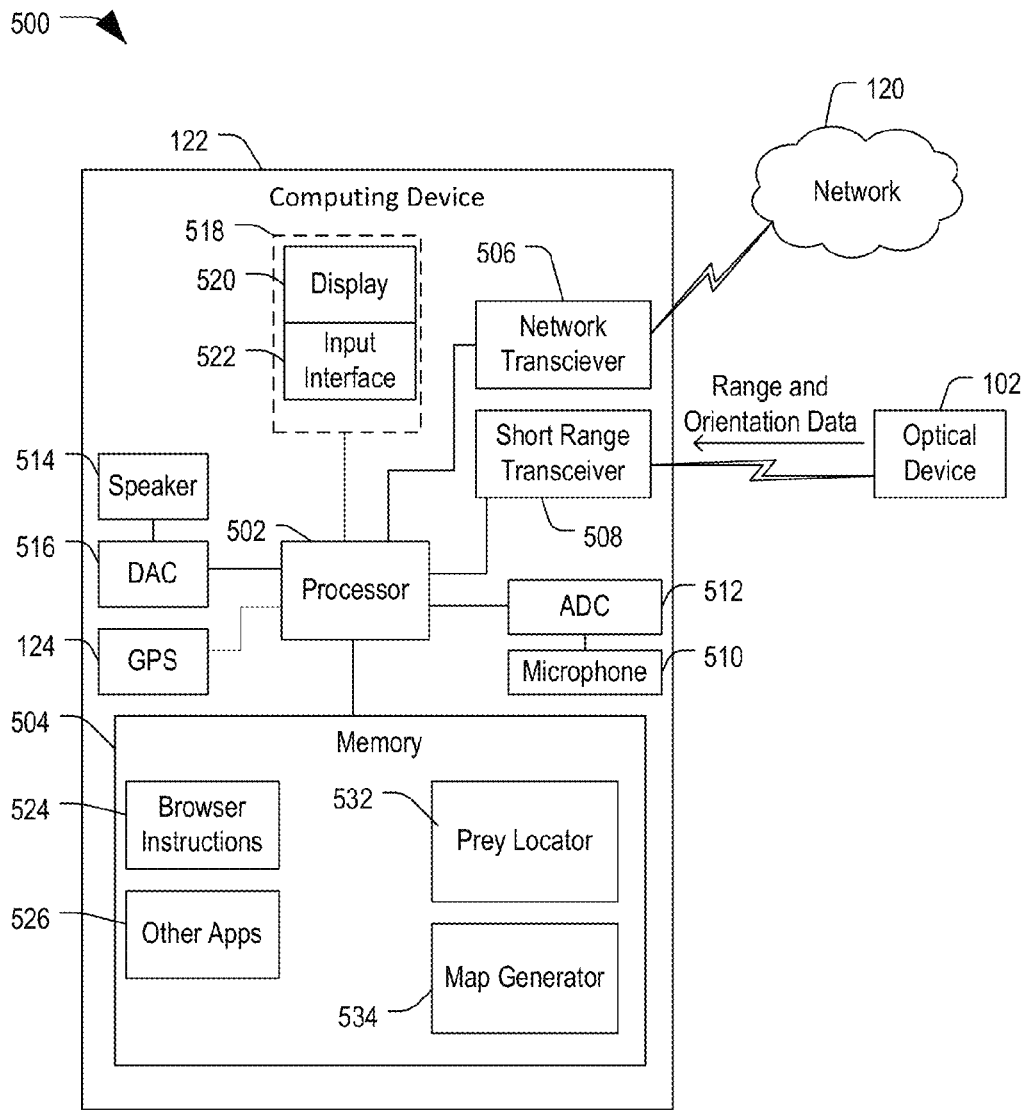
FIG. 5 is a block diagram of a system including an embodiment of the computing device of FIGS. 1 and 4.

FIG. 5 is a block diagram of a system 500 including an embodiment of the computing device 122 of FIGS. 1 and 4. Computing device 122 includes a processor 502 coupled to a memory 504, a network transceiver 506 configured to couple to a network 120, and a short-range transceiver 508 configured to communicate with optical device 102. Processor 502 may be coupled to a GPS circuit 124. Processor 502 is also coupled to a microphone 510 through an analog-to-digital converter (ADC) 512 and to a speaker 514 through a digital-to-analog converter (DAC) 516. Processor 502 is also coupled to a display interface 518 that may include a display 520 and an input interface 522. In a particular example, display interface 518 may be a touch-sensitive interface.

Memory 504 includes browser instructions 524 that, when executed by processor 502, causes processor 502 to generate a graphical user interface including user-selectable elements and a web page. A user may interact with the GUI to browse a network, such as the Internet. Memory 504 also includes other applications, such as calendar applications, calculators, and the like. In an embodiment, computing device 122 may be implemented as a smart phone including traditional functionality associated with such communication devices.

Memory 504 may include prey locator instructions 532 that, when executed, cause processor 502 to receive range data, direction data, and orientation data from optical device 102 and to determine GPS coordinates from GPS circuit 124. Prey locator instructions 532, when executed, may further cause processor 502 to calculate a location of a selected target based on the GPS coordinates of computing device 122 or optical device 102 and the prey data, including the range, direction, and orientation data. Memory 504 may further include map generator instructions 534 that, when executed, cause processor 502 to generate a map including a first indicator representing a current GPS location and a second indicator representing the location of the selected target. In an embodiment, map generator instructions 534 cause processor 502 to retrieve map data from a data source via network 120 and then to provide the first and second indicators on the retrieved map data.

In the illustrated example, computing device 122 included a GPS circuit 124. In some embodiments, the location of computing device 122 may be determined from the locations of nearby radio towers and/or from a location of a nearby wireless access point. Alternatively, optical device 102 may provide the GPS data to computing device 122. In general, the short-range wireless communication link between computing device 122 and optical device 102 places the two devices in close proximity. Accordingly, the GPS coordinates for one of the devices should be sufficiently accurate for a shooter to utilize the location data and the relative orientation and distance data to determine the prey location relative to computing device 122 or optical device 102.

Figure 6:
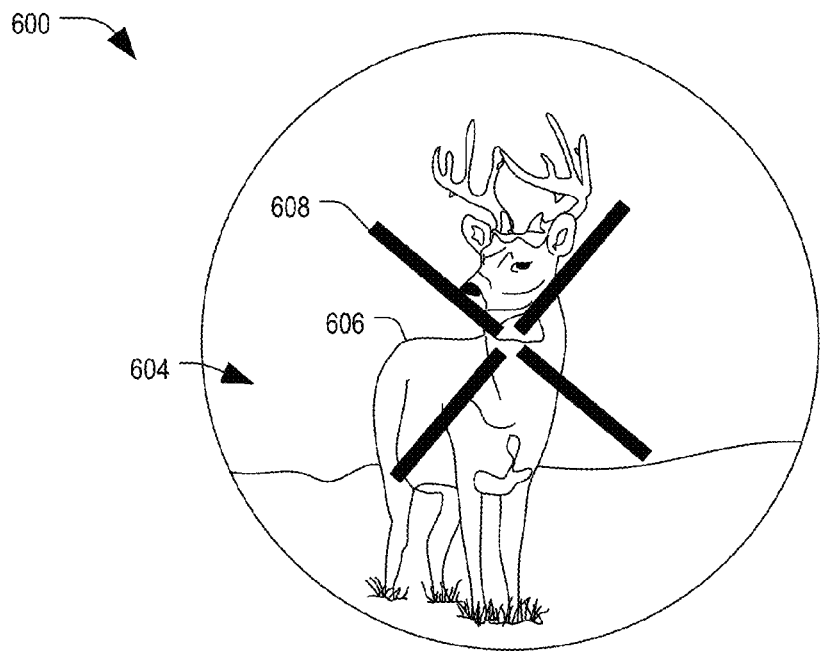
FIG. 6 is a diagram of an embodiment of a portion of the view area presented on a display of the optical device of FIGS. 1-5 and including an aiming reticle.

FIG. 6 is a diagram 600 of an embodiment of a portion of the view area, generally indicated at 604, presented on a display 414 of the optical device 102 of FIGS. 1-5 and including an aiming reticle 608. The circular frame of the portion 604 represents the display within lens 202 of optical device 102. In diagram 600, the user has oriented optical device 102 such that reticle 608 is centered on a possible target 606 within portion 604 of the view area.

The user may interact with one or more of the user-selectable elements 404 to select a target, such as target 606, within portion 604 of the view area. An example of the portion 604 of view area when the target is selected is described below with respect to FIG. 7.

Figure 7:
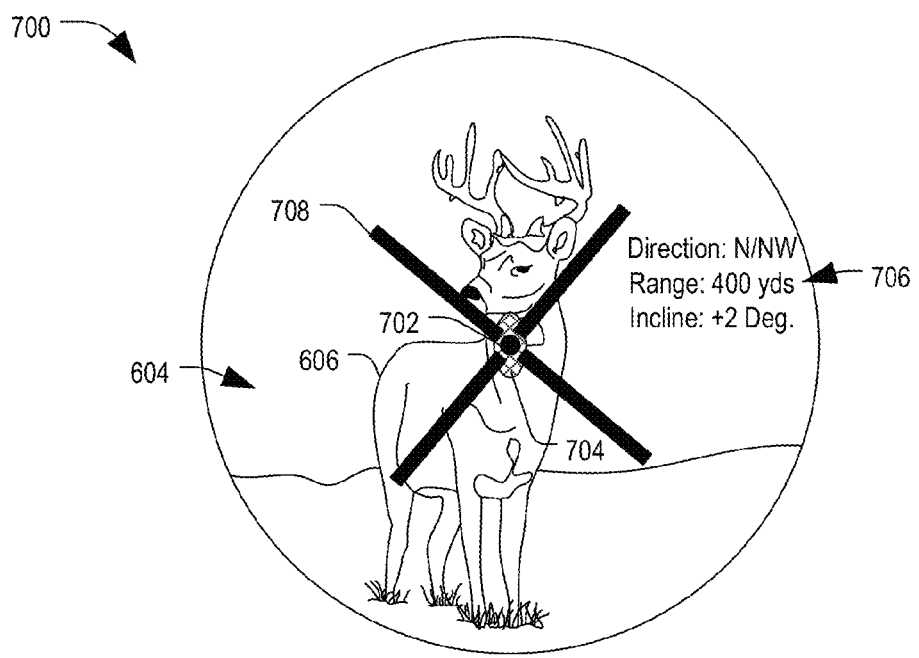
FIG. 7 is a diagram of an embodiment of the portion of the view area of FIG. 6 including a target selection reticle, a visual tag, and a range finder ellipse.

FIG. 7 is a diagram 700 of an embodiment of the portion 604 of the view area of FIG. 6 including a target selection reticle 708, a visual tag 702, and a range finder ellipse 704. The visual tag 702 may be released and applied to target 606 within the optical device 102 in response to user input. Upon selection of the target, optical device 102 may determine a range to the target, as represented by the range finder ellipse 704. Direction, range, and incline data may be presented within the portion 604 of the view area, as generally indicated at 706.

In the view area of FIGS. 6 and 7, the landscape appears to be relatively flat and uncluttered, making it easy for the user to locate the prey after taking the shot. However, in rocky or hilly terrain or at increased distances where a shot may be taken, it may require the shooter to take a circuitous route from the location where a shot is taken to the location of the prey, and locating the prey may be more challenging. Examples of two types of shots that may present a challenge for the user to recover the prey after a shot are described below with respect to FIGS. 8 and 9.

Figure 8:
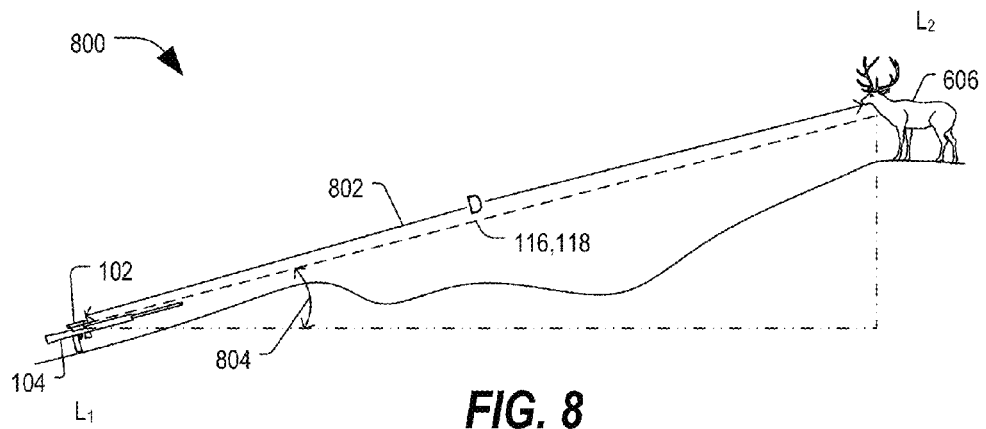
FIG. 8 is a side view of an example of a range-finding operation from a firearm system to a deer.

FIG. 8 is a side view 800 of an example of a range-finding operation from a firearm system including optical device 102 and firearm 104 to a deer (selected target 606). Optical device 102 directs a beam 116 toward selected target 606 and receives a reflected beam 118, which optical device 102 uses to determine a range (labeled "D" for distance) 802 to the selected target 606. However, the distance D is a line of sight measurement, which does not necessarily reflect the terrain between the firearm 104 and the selected target 606. In this instance, the distance (D) 802 represents a hypotenuse of a right triangle; however, the walking path to recover the prey may be greater than the hypotenuse.

Optical scope 102 determines orientation data, such as an angle of incline 804 and a distance, which can be used to refine the distance calculation for determining the location of the animal. In an example, computing device 122 may utilize topographical information corresponding to the location of optical device 102 and selected target 606. Computing device 102 may utilize the range, the inclination, and the topographical information to map the location of selected target 606 onto a graphical map.

Determining the location of the selected target may be made more complicated when the selected target is in the air, such as a bird. An example of a side view depicting a range-finding operation involving air borne prey is described below with respect to FIG. 9.

Figure 9:
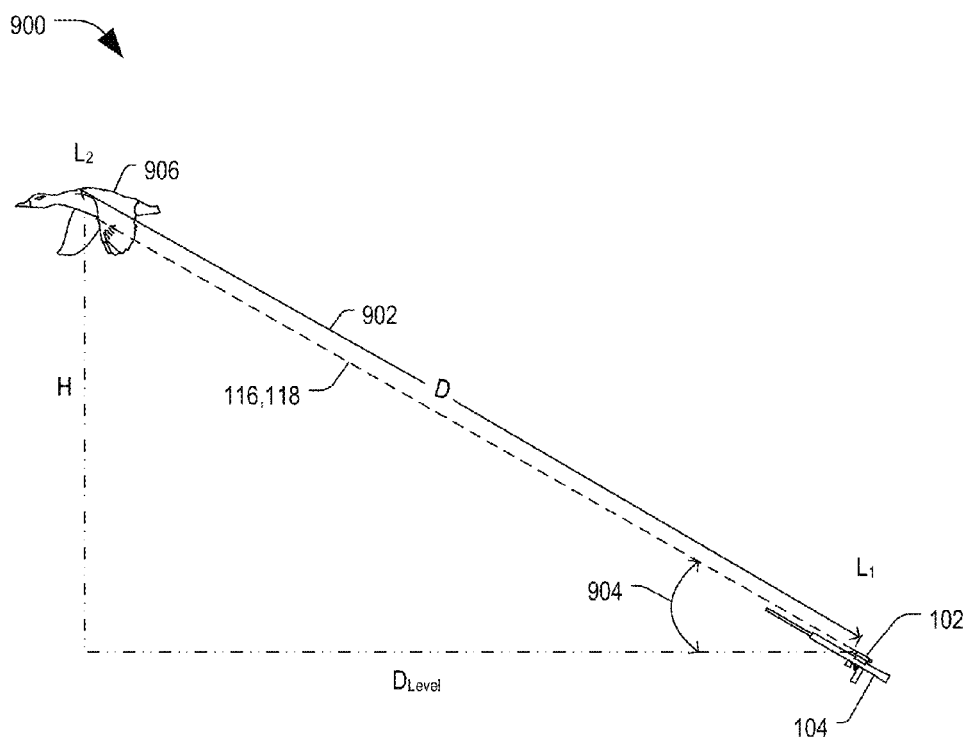
FIG. 9 is a side view of an example of a range-finding operation from a firearm system to a bird in flight.

FIG. 9 is a side view 900 of an example of a range-finding operation from a firearm system including optical device 102 and an associated firearm 104 to a bird in flight (selected target 906). In this particular example, the distance (D) indicated at 902 does not correspond to a distance along the ground. In this example, computing device may utilize the incline information, such as angle 904 and distance (D) to calculate a horizontal component ($D_{Level}$), which may be refined by topographical map details to calculate the location of selected target 906 when it drops from the sky. In a particular example, optical device 102 may capture additional information, such as motion information corresponding to the changing orientation of optical device and the relative position of the selected target over time and estimate the trajectory of the selected target 906 after a shot is fired. Such estimated trajectory may be utilized by computing device 122 to refine a determined location of the selected target after it has come to rest on the ground. Additional factors such as wind speed and other factors may also influence the final (at rest) location of selected target 906. Computing device 122 may include such information in the calculation of the location of selected target 906, which location calculation may be used to produce a digital map indicating the target location.

As previously discussed, computing device 122 may retrieve map data, such as topographical map data, corresponding to the location of optical device 102 and the determined location of the selected target. The map may simply provide directional indications to assist the user in finding the selected target. In one possible embodiment, the map may include a first indicator depicting a first location of optical device, a second indicator depicting a location of the selected target, and a line showing the user's progress from the first location to the second location. An example of such an embodiment is described below with respect to FIG. 10.

Figure 10:
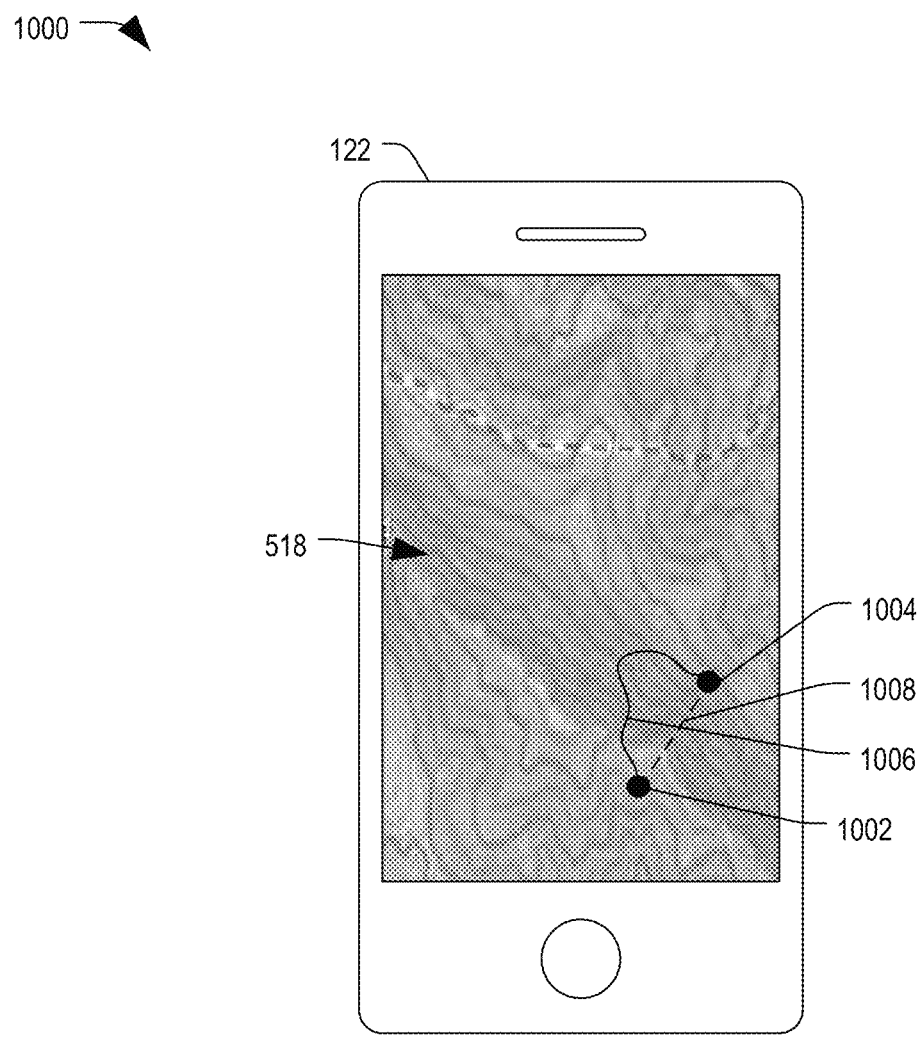
FIG. 10 is a diagram of an example of a digital map presented on a display of the computing device and depicting a shooter's path from a shot location to the location of the animal.

FIG. 10 is a diagram 1000 of an example of a digital map presented on a display interface 518 of the computing device 122 and depicting a shooter's path from a shot location 1002 to the location 1004 of the animal. In the illustrated example, the digital map includes topographical information with locations 1002 and 1004 superimposed on the digital map. While a direct line (line of sight) is indicated at 1008, the user may take an indirect route as indicated at 1006. Computing device 122 may update the current position of optical device 102 or computing device 122 as the user advances, allowing the user to adjust his/her route to eventually arrive at the location 1004 of the selected target.

In conjunction with the systems and methods described above with respect to FIGS. 1-10, a system is disclosed that includes an optical device configured to determine range, orientation, and direction data associated with a selected target and to provide the data to a computing device, such as a smart phone. The computing device is configured to receive the range, orientation, and direction data, to determine GPS coordinates, and to calculate the location of the selected target relative to the GPS coordinates. The computing device may present a graphical map including the location of the optical device and the location of the selected target to a display interface, such as a touch-screen interface of computing device.

Although the present invention has been described with reference to preferred embodiments, workers skilled in the art will recognize that changes may be made in form and detail without departing from the scope of the invention.

What is claimed is:

1. A method comprising:
   receiving location data corresponding to a physical location of a user at a computing device;
   receiving prey data corresponding to a relative position of an animal at the computing device from a gun scope;
   determining a location of the animal relative to the computing device based on the location data and the prey data using the computing device;
   generating a digital map depicting the physical location of the computing device and the location of the animal; and
   updating the digital map in response to a change in the physical location of the computing device by drawing a line from a first indicator corresponding to the physical location of the computing device to a second indicator corresponding to new physical location of the computing device in response to movement of the computing device.

2. The method of claim 1, wherein the prey data includes range data corresponding to a range to the animal and directional data from the gun scope.

3. The method of claim 2, wherein the prey data further includes incline data corresponding to an incline of the gun scope when the range data was captured.

4. The method of claim 2, wherein determining the location of the animal comprises calculating a distance and direction of the animal relative to the computing device based on the location data and the prey data.

5. The method of claim 1, wherein receiving the location data comprises:
   retrieving global positioning satellite (GPS) coordinates corresponding to the physical location of at least one of the gun scope and the computing device; and
   when GPS data are not available, retrieving location data from a wireless communications network.

6. A computing device comprising:
   a display;
   a processor coupled to the display; and
   a memory accessible to the processor and configured to store instructions that, when executed by the processor, cause the processor to:
      determine location data corresponding to a physical location of at least one of a gun scope and the computing device;
      receive prey data corresponding to a relative position of an animal;
      determine a physical location of the animal based on the location data and the prey data;
      generate a map indicating the location data and the physical location of the animal;
      provide the map to the display; and
      selectively update the map to indicate new location data by drawing a line from a first indicator corresponding to the location data to a second indicator corresponding to new location data of the at least one of a gun scope and the computing device in response to movement.

7. The computing device of claim 6, wherein the prey data comprises range data and orientation data.

8. The computing device of claim 7, wherein the orientation data comprises a directional parameter, an incline parameter, and a cant parameter of a firearm coupled to the gun scope.

9. The computing device of claim 6, further comprises a transceiver coupled to the processor and configured to communicate with the gun scope through a wireless communication link.

10. The computing device of claim 9, wherein the prey data is received from the gun scope through the wireless communication link.

11. The computing device of claim 9, wherein the location data is received from the gun scope through the wireless communication link.

12. The computing device of claim 6, wherein the computing device comprises at least one of a smart phone, a laptop, a tablet computer, and an electronic global positioning satellite (GPS) device.

13. A computer-readable storage device configured to store instructions that, when executed by a processor, cause a processor to:
   receive location data associated with a physical location of at least one of a computing device associated with the processor and a gun scope configured to communicate with the computing device;
   receive prey data corresponding to a position of a selected target relative to the gun scope;
   determine a location of the selected target based on the location data and the prey data;

generate a map including a first indicator corresponding to the location data and a destination indicator corresponding to the location of the selected target;

provide the map to a display; and selectively update the map to draw a line from the first indicator to a second indicator corresponding to new location data in response to movement of the at least one of the computing device and the gun scope.

14. The computer-readable storage device of claim 13, wherein the instructions further include instructions that, when executed, cause the processor to:

track the location data over time to determine changes in the location data; and update the map to depict the changes.

15. The computer-readable storage device of claim 13, wherein the instructions cause the processor to receive the location data by retrieving global positioning satellite (GPS) coordinates from a GPS circuit within the computing device.

16. The computer-readable storage device of claim 13, wherein the computing device comprises one of a smart phone, a laptop computer, and a tablet computer.

17. The computer-readable storage device of claim 13, wherein the prey data comprises at least one of:

range data corresponding to a distance between the gun scope and the animal, cant data corresponding to a cant of a firearm coupled to the gun scope, incline data corresponding to an incline of the firearm, and directional data.

* * * * *